United States Patent [19]

Bees et al.

[11] Patent Number: 5,673,939

[45] Date of Patent: *Oct. 7, 1997

[54] FUEL TANK FOR STORING AND DISPENSING HYDROGEN AND OXYGEN GAS TO A FUEL CELL

[75] Inventors: William J. Bees, Wadsworth; Joseph J. Mascolino, Canton; Robert D. Klingensmith, Canal Fulton, all of Ohio

[73] Assignee: The Babcock & Wilcox Company, New Orleans, La.

[*] Notice: The term of this patent shall not extend beyond the expiration date of Pat. No. 5,658,013.

[21] Appl. No.: 530,917

[22] Filed: Sep. 20, 1995

[51] Int. Cl.$^6$ .................................................. B60P 3/22
[52] U.S. Cl. .......................................... 280/831; 280/834
[58] Field of Search .......................... 280/830, 831, 280/832, 834

[56] References Cited

U.S. PATENT DOCUMENTS

| Re. 34,807 | 12/1994 | Schaub et al. | 23/276 |
|---|---|---|---|
| 1,177,007 | 3/1916 | Auerbacher | 280/834 |
| 1,860,531 | 5/1932 | Eberhard | 280/834 |
| 3,565,201 | 2/1971 | Petsinger | 180/54 |
| 3,608,660 | 9/1971 | Smith et al. | 280/834 X |
| 3,884,255 | 5/1975 | Merkle | 137/265 |
| 4,143,193 | 3/1979 | Rees | 428/35 |
| 4,359,118 | 11/1982 | Latter et al. | 180/54 B |
| 4,463,734 | 8/1984 | Akeroyd | 123/525 |
| 4,852,892 | 8/1989 | Reid | 280/834 |
| 4,923,768 | 5/1990 | Kaneko et al. | 429/19 |
| 4,988,580 | 1/1991 | Ohsaki et al. | 429/19 |
| 5,035,206 | 7/1991 | Welch et al. | 123/27 GE |
| 5,082,751 | 1/1992 | Reichner | 429/19 |
| 5,117,801 | 6/1992 | Schaub et al. | 123/575 |
| 5,139,002 | 8/1992 | Lynch et al. | 123/575 |
| 5,193,635 | 3/1993 | Mizuno et al. | 180/65.3 |
| 5,212,431 | 5/1993 | Origuchi et al. | 318/139 |
| 5,228,423 | 7/1993 | Oikawa et al. | 123/525 |
| 5,228,529 | 7/1993 | Rosner | 180/653 |
| 5,248,566 | 9/1993 | Kumar et al. | 429/19 |
| 5,249,637 | 10/1993 | Heidl et al. | 180/65.2 |
| 5,250,368 | 10/1993 | Golben et al. | 429/17 |
| 5,271,357 | 12/1993 | Hsu et al. | 123/23 |
| 5,327,987 | 7/1994 | Abdelmalek | 180/65.2 |
| 5,330,031 | 7/1994 | Hill et al. | 180/271 |
| 5,346,031 | 9/1994 | Gardner | 180/179 |
| 5,359,308 | 10/1994 | Sun et al. | 335/216 |
| 5,366,820 | 11/1994 | Tsutsumi et al. | 429/19 |
| 5,370,418 | 12/1994 | Pugh | 280/830 |
| 5,376,470 | 12/1994 | Sprouse | 429/19 |
| 5,443,578 | 8/1995 | Davis, Jr. | 280/834 |

FOREIGN PATENT DOCUMENTS 2-241826  9/1990  Japan ............................. 280/831

*Primary Examiner*—Kevin Hurley
*Attorney, Agent, or Firm*—Daniel S. Kalka; Robert J. Edwards

[57] ABSTRACT

A dual-gas fuel tank assembly for a fuel cell driven vehicle wherein the fuel tank is interposed within the vehicle frame as an integral portion thereof with the tank assembly having a plurality of cylindrical pressure tanks of composite material construction for containing oxygen gas and the cylindrical tanks being partially nested within the tank assembly housing to leave substantial space around the pressure tanks for storing metal hydride powder therein for producing hydrogen gas to the fuel cell upon application of heat thereto.

19 Claims, 4 Drawing Sheets

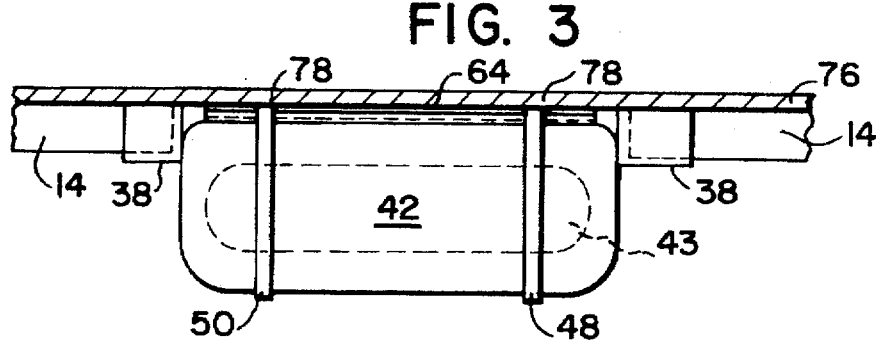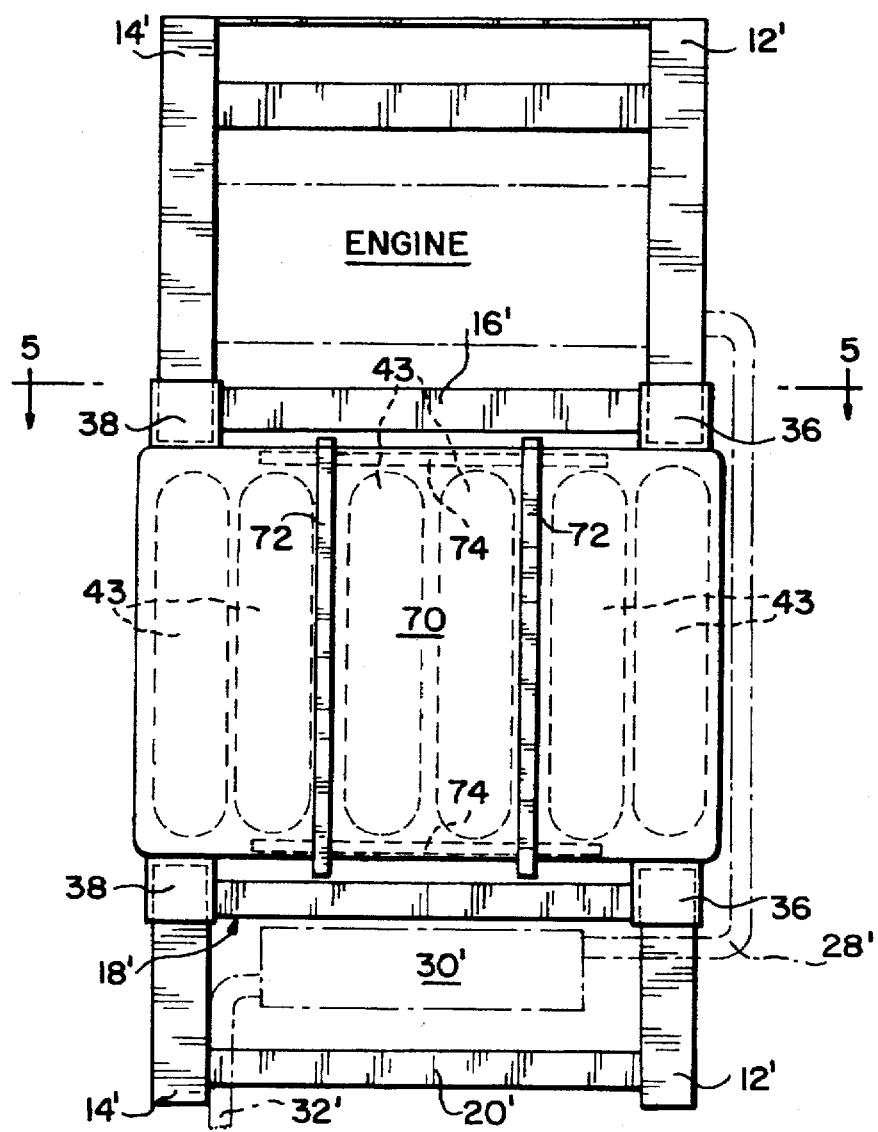

5,673,939

FUEL TANK FOR STORING AND DISPENSING HYDROGEN AND OXYGEN GAS TO A FUEL CELL

BACKGROUND OF THE INVENTION

1. Field of the Invention

The present invention relates generally to a fuel tank for storing and dispensing gaseous fuel to a fuel cell driven vehicle and in particular to a fuel tank which holds and dispenses two gaseous fuels to such a vehicle.

2. Description of the Related Art

Modern transportation requires the extensive use of over-the-road vehicles such as automobiles, vans, trucks, and the like. Presently, such vehicles are powered by an engine which is fueled by gasoline or diesel fuel. The use of such fuels has given rise to two apparent shortcomings. First, such fuels are in limited supply throughout the world and the international control of such fuels causes their price and availability to be uncertain. A second shortcoming of such fuels is their adverse impact on the environment. It is generally believed that the hydrocarbon gases released from the combustion of gasoline or diesel fuel in an internal combustion engine is environmentally undesirable.

Hence an alternate fuel powered vehicle is needed for future uses. Vehicles are known that are powered by fuel cells which run on various gases to produce electric current used to operate electric motors which run the vehicle. Such fuel cells are described in U.S. Pat. No. 4,826,741. As an example of such fuel cell vehicles, U.S. Pat. Nos. 5,193,635, and 5,250,368 both describe vehicles with a fuel cell system which include the use of a metal hydride battery. However, there is no teaching of such a battery arrangement of gas cylinders with the metal hydride forming a structural part of the vehicle as in the present invention.

SUMMARY OF THE INVENTION

The present invention provides a vehicle fuel tank for containing and dispensing two gaseous fuel constituents to a motor vehicle. This tank is unique in that its physical structure comprises a load-carrying member of the vehicle's structure. This feature enables the tank to be placed where it will not consume space on the vehicle which would normally be used for passengers and/or cargo while allowing adequate fuel carrying capacity to permit an economically viable vehicle range to be obtained. The fuel tank of this invention will provide the means to store the fuel components required to operate an on-board fuel cell. The fuel cell, driving the vehicle, is an electrochemical device which converts the chemical energy of a fuel or a combination of fuels directly into electrical and thermal energy. For example, in a proton-exchange-membrane (PEM) fuel cell (also known as a polymer electrolyte fuel cell), oxygen and hydrogen are fed to the fuel cell to produce electric current along with heat and water. Stacks of fuel cells are connected in series to provide a power source of sufficient capacity to power all or some of the vehicle systems. This invention can also be employed to provide hydrogen and oxygen to other types of fuel cells using such gases. Another such fuel cell is an alkaline fuel cell.

The fuel tank of the present invention is comprised of some number (depending upon vehicle size and/or configuration) of cylindrical compressed gas containers containing a gaseous fuel constituent such as oxygen which are affixed into an outer tank or housing which is an integral part of the vehicle load-carrying structure. The space around the exterior of the compressed gas cylinders but within the outer tank or housing consists primarily of a metal hydride material usually in the form of a powder. Metal hydrides are alloys which can store a large volume of hydrogen in a metal/hydrogen complex at relatively low pressures. Hydrogen reacts reversibly with these alloys allowing the charging/discharging of hydrogen gas. Hydrogen is liberated from the metal hydride by the application of heat which can (in part) be provided by the heat generated by the operation of the fuel cell and transferred to the metal hydride in the tank by convection and/or conduction.

The compressed gas cylinders are affixed within the outer tank or housing to prevent their relative movement and to prevent detrimental displacement during impact, such as during a collision, by the metal hydride material (powder) which surrounds them.

The present invention will thus provide a means to store an adequate amount of oxygen and hydrogen on board a vehicle sufficient to power a proton-exchange-membrane (PEM) fuel cell, or other type of fuel cell such as an alkaline fuel cell (AFC), which will provide electrical power to the vehicle for propulsion and/or other accessories.

Thus one aspect of the present invention is to provide a dual gas fuel tank for vehicles in which the tank forms an integral and structural element of the vehicle frame.

A further aspect of the present invention is to provide a fuel tank containing both hydrogen and other gaseous for dual-fuel powered vehicles.

An additional aspect of the present invention is to provide a dual-gas fuel tank wherein a number of tubular fuel tanks of high pressure filled with oxygen are maintained within a fuel tank outside housing which forms an integral and structural element of the vehicle frame with the space between the cylindrical gas tanks and the internal walls of the outside housing holding metal hydrate.

Still a further aspect of the invention is to provide a dual gas fuel tank for fuel cell driven vehicles wherein a plurality of high pressure tanks holding oxygen are maintained structurally within the tank housing. This forms a structural element of the vehicle frame. Metal hydrate powder fills the space between the inner walls of the tank housing and the oxygen cylinders.

The various features of novelty which characterize the invention are pointed out with particularity in the claims annexed to and forming a part of this disclosure. For a better understanding of the present invention and the operating advantages attained by its uses, reference is made to the accompanying drawings and descriptive matter in which a preferred embodiment of the invention is illustrated.

BRIEF DESCRIPTION OF DRAWINGS

In the drawings:

FIG. 3 is a side elevational view in partial section taken along the line 3—3 of FIG. 2;

FIG. 4 is a bottom plan view of a front-wheel drive fuel cell driven vehicle showing the implementation of the dual-gas fuel tank of the present invention;

DESCRIPTION OF THE PREFERRED EMBODIMENT

Figure 1:
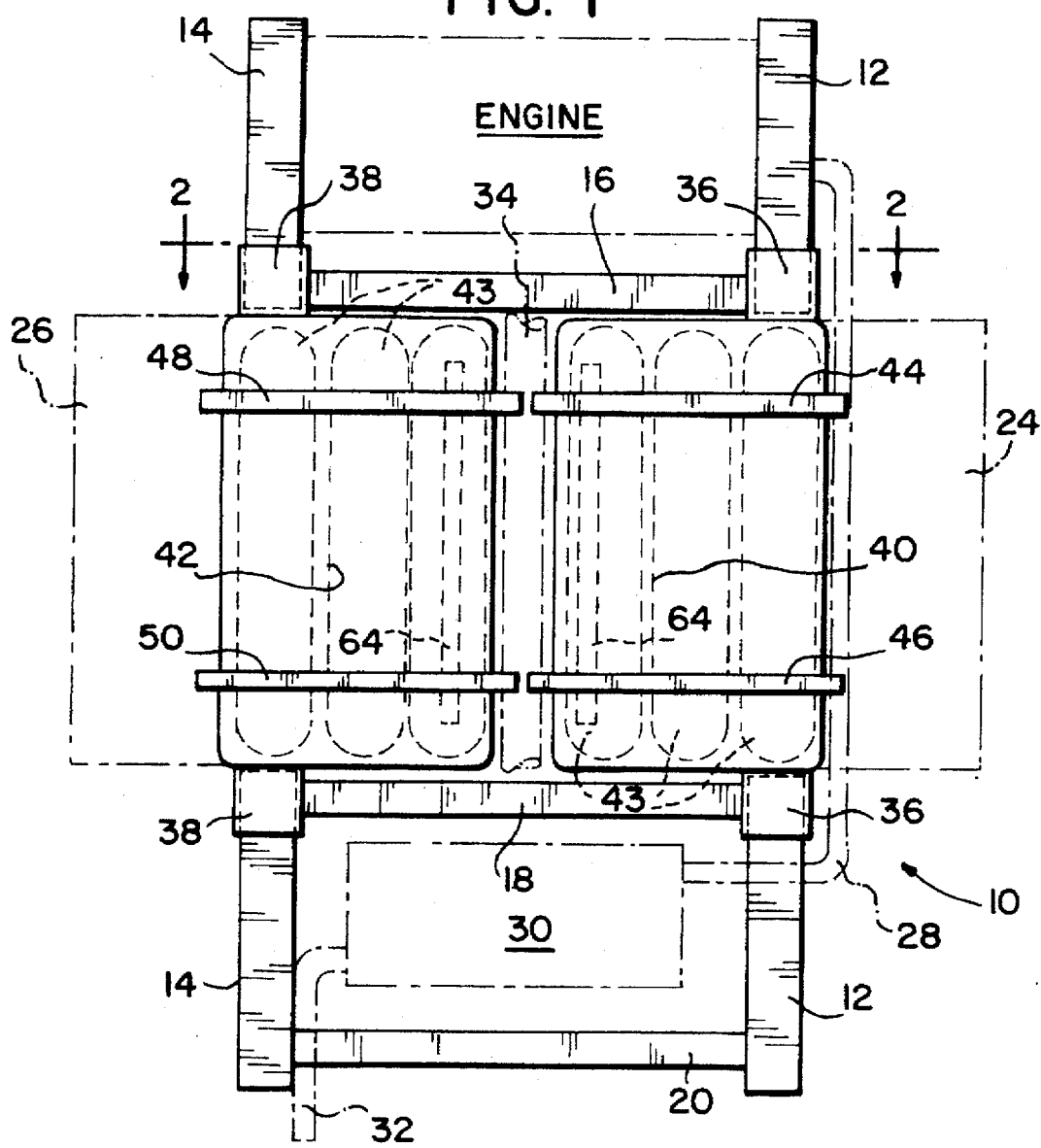
FIG. 1 is a bottom plan view of a rear-wheel-drive fuel cell driven vehicle showing one embodiment of the dual-gas fuel tank of the present invention.

Referring now to the drawings and first to FIG. 1., it can been seen that a fuel cell driven vehicle frame of the rear-wheel-drive type is designated generally by the numeral 10. The frame 10 includes a pair of side rails or members 12, 14 which are interconnected by spaced apart laterally extending cross members 16, 18, 20. Right and left step wells 24, 26 may be provided along each side of the vehicle frame 10 in standard fashion. Also included as a portion of a typical vehicle is an exhaust pipe 28 extending along a side of the frame 10 to interconnect with a muffler 30 from which extends a tailpipe 32. In somewhat standard fashion in a rear-wheel-drive vehicle, a drive shaft 34 extends centrally along the bottom of the frame 10 between a transmission and a differential assembly.

According to one embodiment of the invention, a pair of dual-gas fuel tanks 40, 42 are fixed beneath the vehicle frame 10 and caused to be an integral portion thereof. Preferably, the tanks 40, 42 are of stainless steel construction and design which will allow the weight of the tank to be within reasonable limits for a motor vehicle and to preclude corrosion due to the fuels carried and the environment in which the tank assembly will perform. Advanced materials such as fully-composite or fiberglass reinforced materials could also be used. Inside each tank 40, 42 are a number of compressed gas cylinders 43 again manufactured from fully-composite or fiberglass—reinforced cylinders which may be aluminum or plastic lined. These cylinders are manifolded in a known manner to allow them to supply gas to the vehicle fuel cell. The space 45 between the tanks 43 and the inner walls of tanks 40, 42 are filled with a metal hydrate such as Nickel (Ni) or Lanthanum (La) alloy. Although any chemical compound containing hydrogen may be called a hydride, the term hydride is usually reserved for combinations of hydrogen and metals. Lithium hydride, LiH, is an example of a saltlike hydride. This type of hydride has an ionic character and is believed to consist of a metal cation and a hydride anion. The combination of hydrogen and boron forms a series of hydrides celled boranes. The derivative sodium borohydride, is important as a selective reducing agent in organic chemistry.

Figure 2:
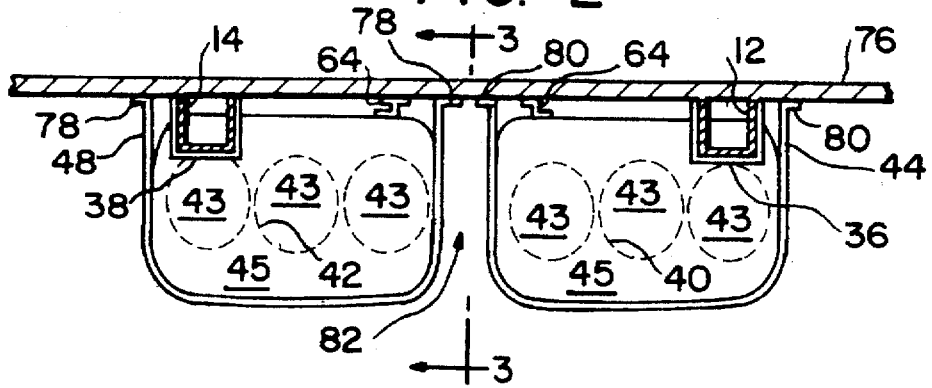
FIG. 2 is an end elevational view in partial section taken along the line 2—2 of FIG. 1.

In standard vehicle construction, each of the side rails or members 12, 14 would be of continuous length. However, according to the instant invention, the side rails 12, 14 are removed at the area receiving the tanks 40, 42 and are structurally replaced by the tanks themselves. As shown in FIGS. 1–3, the overlay frame channel members 36 are welded to or otherwise formed as an integral portion of the tank 40, while the overlay frame channel members 38 are similarly made as an integral portion of the tank 42. The overlay channel members 36, 38 are then received upon respective end portions of the side rails or frame members 12, 14 and welded thereto. The actual welding and affixing of the frame overlay channel members 36, 38 to the frame members 12, 14 and tanks 40, 42 would be readily perceived and appreciated by those skilled in the art.

It will be appreciated that the instant invention contemplates the channel members 36, 38 receiving the side rails or frame members 12, 14 therein, as shown in the drawings. However, it is also envisioned that the channel members 36, 38 may be received within the channels defined by the side rails 12, 14. In either event, it will be understood by those skilled in the art that the continuous extension of the side rails 12, 14 is effected by the interpositioning of respective tanks 40, 42 which, through the provision of the frame overlay channel members 36, 38 attains side rail construction which is continuous and integral with the tanks 40, 42. Of course, the extent of overlap between the members 36, 38 and the respective side rails 12, 14 determines, to some degree, the overall integrity of the frame assembly 10.

If necessary, the junction of the overlap between the channel members 36, 38 and side rails 12, 14 may be further strengthened by implementing a plate bridging the junction and being affixed to each of the associated channel members 36, 38 and side rails 12, 14. It has been found that a metal stock plate having a thickness on the order of 0.25 inch may be bolted or otherwise secured over the junction for such purposes. Those skilled in the art will appreciate that the side rails 12, 14 are fabricated of steel and have a thickness of approximately 0.125 inch and, accordingly, the channel members 36, 38 are preferably constructed of similar material.

Also presented as a portion of the invention, and adding additional support to the tanks, are straps 44, 46, 48, 50 which are secured to the floor 76 of the vehicle. As shown in FIG. 2, the strap 44 is provided with legs or flanges 80 at the ends thereof, while legs or flanges 78 are provided at the ends of the straps 48. Of course, the straps 46, 50 would have similar flanges at their ends. The flanges 78, 80 may be welded, bolted, or otherwise affixed to the floor 76 of the vehicle, providing further support to the tanks 40, 42.

With further attention to FIGS. 2 and 3, it can be seen that an angle iron 64 is welded or otherwise appropriately attached along the length of each of the respective tanks 40, 42 and is also welded or otherwise appropriately attached to the floor 76. Those skilled in the art will now readily appreciate that the dual-fuel tanks 40, 42 are not only rendered as an integral portion of the side rails or members 12, 14, but may also be rendered as an integral portion of the floor 76, as well. Accordingly, although the side rails or members 12, 14 appear to be discontinuous as a result of the insertion of the tanks 40,42, the presence of the tanks 40, 42, made of heavy gauge metal as aforesaid, provides increased strength and integrity to the vehicle frame 10.

It is further presented that the tanks 40, 42 are of non-circular cross section. By providing such tanks with a substantially rectangular cross section, the volume of the tanks is maximized for the space allotted to the metal hydride contained around the gas tanks 43. Preferably, the edges of the tanks 40, 42 are rounded, as shown.

Figure 5:
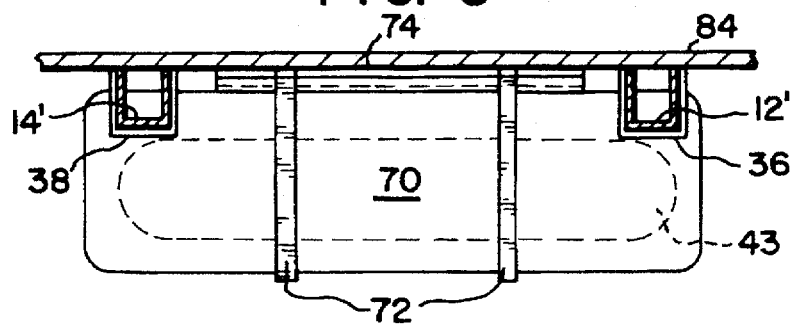
FIG. 5 is an end elevational view in partial section of the embodiment shown in FIG. 4 taken along the line 5—5.

With reference now to FIGS. 4 and 5, it can be seen that the concept of the invention can be readily implemented with front-wheel-drive fuel cell driven vehicles. Here, vehicle frame slide rails or members 12', 14' are interconnected with cross members 16', 18', 20', with an exhaust pipe 28', muffle 30', and tailpipe 32' provided in ordinary fashion. Since no drive shaft is required for the front wheel drive vehicle, a single dual fuel tank 70, of substantial size, can be employed. Thus more compressed gas tanks 43 may be located therein. Again, in the preferred embodiment of the invention the structure of the tank 70 would be similar to that of the tanks 40, 42, using substantially the same materials, welding techniques, and the like to assure the necessary structural integrity and ability to withstand the pressures aforesaid. Known manifolding and selective fuel switching would also be similar to that described for tank 40, 42.

As shown in FIGS. 4 and 5, frame overlay channel members 36, 38 are again welded to the tank 70 and to respective side rail members 12', 14'. In this instance, the tank 70 not only provides for a continuity of the respective side rail member 12', 14', but also serves to interconnect them as well. Additionally, straps 72 are affixed to the floor 84 of the vehicle as by welding, bolting, or the like, and also serve to provide vertical support for the tank 20. Also included are angle irons 74 traversing center portions fore and aft of the tank 70, the same being welded to both the tank 70 and to the floor 84. Accordingly, the tank 70 is an integral portion of not only the side rails 12', 14' of the frame, but also provides strength and rigidity to the floor 84, further interconnecting the floor 84 with the remainder of the vehicle frame.

As presented above, the frame overlay channel members 36, 38 may be of such nature as to receive the respective ends of the side rails 12', 14', or they may be so configured as to be received within the channels of the side rails 12', 14'. Both concepts are envisioned as a portion of the instant invention.

By manufacturing the tanks of metal or of composite material; as mentioned above, the tanks serve not only as frame members for the vehicle, but are also of sufficient strength to be resistant to impacts from crashes or the like. Accordingly, the instant invention provides for structural vehicle integrity, enhanced safety and environmental compatibility.

Figure 6:
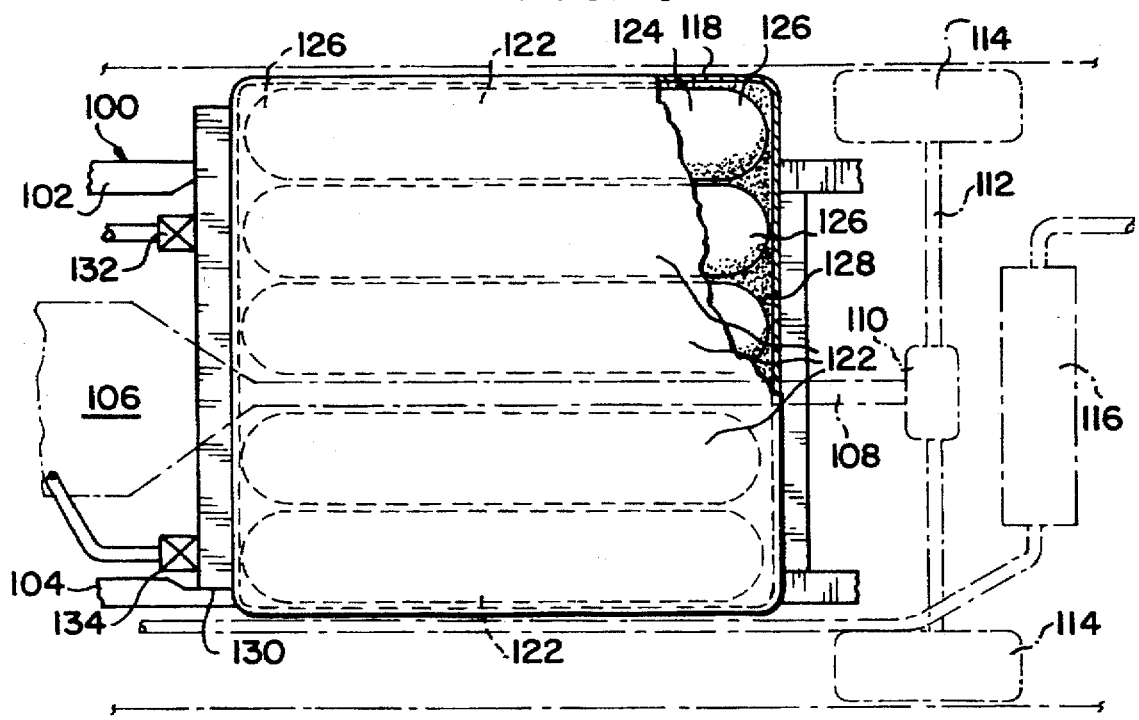
FIG. 6 is a top plan illustrative view of an embodiment of the invention wherein a plurality of cylindrical composition tanks are maintained in a single tank housing of a rear wheel drive fuel cell driven vehicle.
Figure 7:
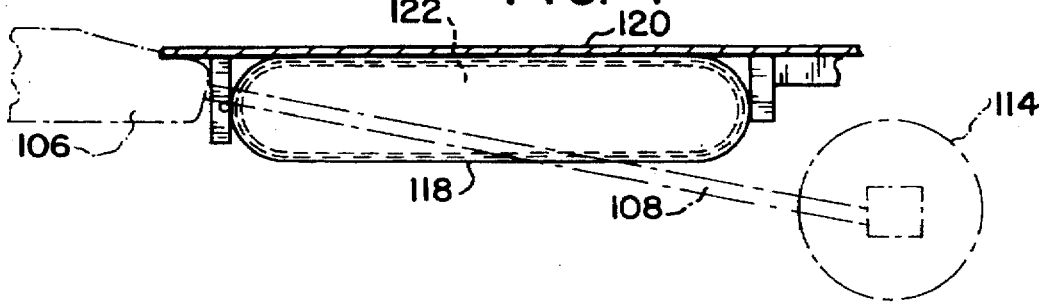
FIG. 7 is a side elevational view of the embodiment shown in FIG. 6.

As shown in FIGS. 6 and 7, a vehicle frame for a modified rear wheel drive fuel cell driven vehicle is designated generally by the numeral 100. As presented above with respect to FIGS. 1-5, the vehicle frame 100 includes appropriate side rails or members 102, 104 with necessary cross members as is well understood and appreciated by those skilled in the art. In the preferred embodiment of FIGS. 6 and 7, the engine 106 is interconnected by means of a drive shaft 108 to a differential 110 at the rear of the vehicle. The axle 112 extends from the differential 110 into driving interconnection with the rear drive wheels 114. Of course, an appropriate muffler 116 and other portions of the exhaust system and the like are maintained beneath the vehicle as shown.

According to the invention, a dual-gas fuel tank housing 118 of advanced composite material or other suitable construction such as metallic or fiber reinforced fiberglass is mounted in identical fashion to the fuel tanks described above with respect to FIGS. 1-5. In other words, the fuel tank housing 118 becomes an integral portion of the vehicle frame and interconnects with the side rails or members 102, 104 as previously discussed. It will, of course, be appreciated that with the drive shaft 108 passing from the engine 106 to the differential 110, and with the fuel tank housing 118 being interposed therebetween, accommodation must be made for passage of the drive shaft 108. In this regard, either dual tanks may be provided as described above with respect to FIGS. 1 and 2, or the fuel tank housing 118 preferably may be configured with an appropriate recessor the like to accommodate passage of the drive shaft 108. In any event, the fuel tank housing (or housings) 118 interconnect with the frame members 102, 104 and is appropriately welded or otherwise interconnected and affixed to the vehicle floor 120 as earlier presented herein.

In the preferred embodiment, the compressed oxygen gas is used in association with the dual-gas fuel tank housing 118 which has a plurality of cylindrical tanks 122. Each of the tanks 122 is similar to the tanks 43 described earlier and has a cylindrical body member 124 and hemispherical end caps 126.

The cylindrical tanks 122 like the tanks 43 are preferably constructed of a composite material as commonly used for pressure vessels. Such are sufficient to maintain the pressure presented above. Fiber reinforced composite materials such as graphite, carbon, or boron composites are suitable for implementation with the instant invention. Similarly, filament wound structures as presently employed as pressure vessels would also suffice. Fiber reinforced plastics such as fiberglass wound provide sufficient strength to accommodate the high pressures necessary in an oxygen or compressed gas fuel tank.

The cylindrical tanks 122 and the tanks 43 are preferably nested or otherwise retained within the fuel tank housing 118 as will be described in more detail with reference to FIG. 10. The nest 128 is provided by the metal hydride to receive and maintain the cylindrical tanks 122. The metal hydride is contained in the open area around the oxygen cylinders in preferably powder form and provides the hydrogen fuel to the vehicle in a known manner through the application of heat.

An appropriate manifold 130 is provided in interconnection with each of the cylindrical tanks 122 and 43. Accordingly, a single inlet valve 132 may be interconnected with the manifold for charging the cylindrical tanks 122, while a single outlet valve 134 may be interconnected with the manifold to pass the oxygen gas to the fuel cell.

Figure 8:
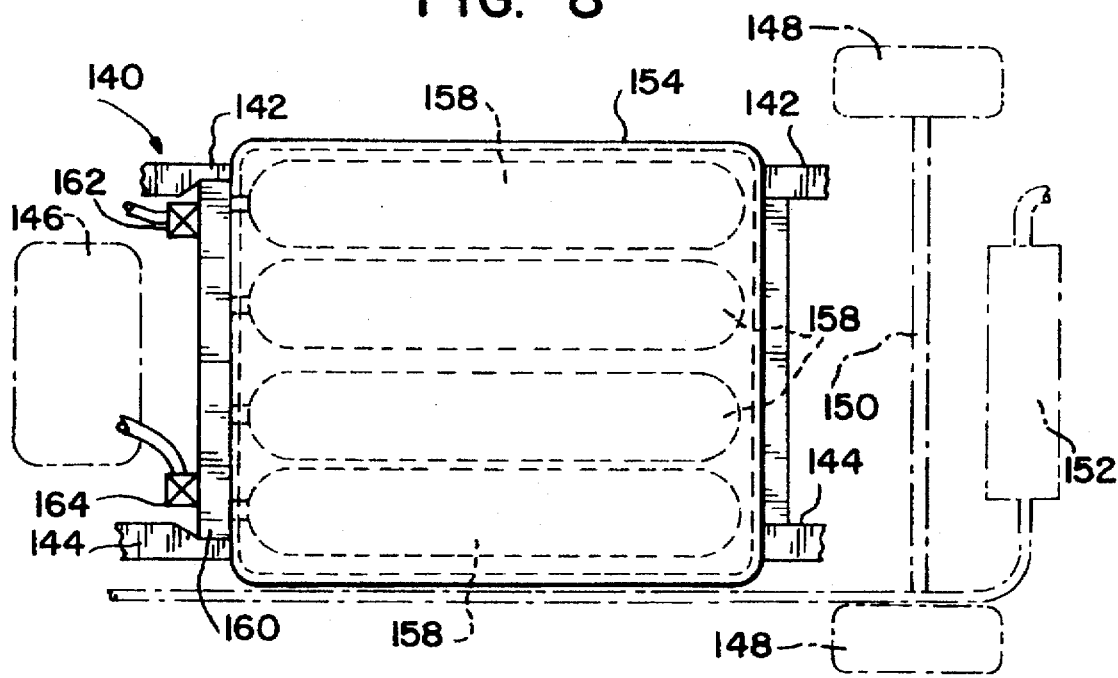
FIG. 8 is a top plan illustrative view of another embodiment of the invention similar to FIG. 6 as applied to a front wheel drive fuel cell driven vehicle.
Figure 9:
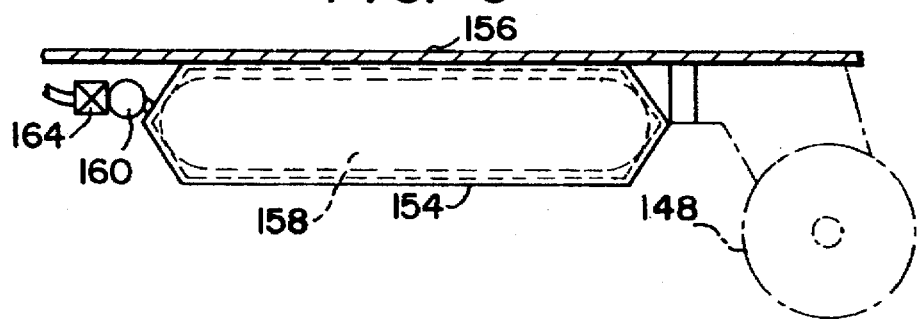
FIG. 9 is a side elevational view of the embodiment shown in FIG. 8.

As shown in FIGS. 8 and 9, the concept of a dual gas fuel tank housing retaining a plurality of high pressure tanks of cylindrical composite construction may also be employed in a front wheel drive vehicle. The frame for such a vehicle is designated generally by the numeral 140, and the same is again shown as including side rails or members 142, 144 and appropriate cross members as required. The engine 146 is connected through an appropriate transaxle or the like to drive the front wheels (not shown). Again, rear wheels 148 are mounted upon opposite ends of the rear axle 150, with a muffler and appropriate exhaust system 152 also being provided beneath the vehicle.

As with the embodiment of FIGS. 6 and 7, a fuel tank housing 154 of composite material construction is mounted in a manner similar to that described above with respect to FIGS. 1-7 so as to comprise an integral part of the vehicle frame by interconnection with the side rail members 142, 144 and by appropriate fixing to the floor 156. Cylindrical high pressure tanks 158 of appropriate composite material as discussed above are maintained within the fuel tank housing 154 and are interconnected with each other by an appropriate manifold 160. As with the embodiment of FIGS. 6 and 7, an appropriate inlet valve 162 allows for the charging of the cylindrical tanks 158, while a single outlet valve 164 provide for passage of the gas from the tanks 158 to the fuel cell on board the vehicle. Of course, the valves 162, 164 are interconnected with the manifold 160.

It will be appreciated that, in the case of a front wheel drive vehicle, a single fuel tank housing 154 may house all of the cylindrical tanks 158, and no configuring of the fuel tanks housing 154 is necessary to accommodate the drive shaft.

Figure 10:
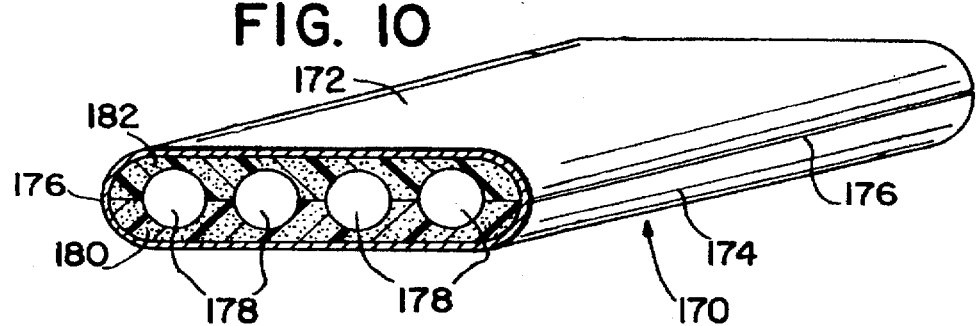
FIG. 10 is a perspective view, partially broken away, of the tank assembly showing the nesting of the cylindrical composite tanks within the metal hydrate powder inside the dual-gas fuel tank.

With reference now to FIG. 10, it can be seen that a fuel tank assembly of the type employed in the embodiments of FIGS. 1–9 is designated generally by the numeral 170. As shown, tank halves 172, 174 of a clam shell design are configured to receive a plurality of composite or metallic tanks 178 therein and then to be closed by means of an appropriate weldment 176 or other seal extending about the periphery of the tank assembly. The composite or metal tanks 178 are of the nature described above, having a cylindrical mid section with hemispherical or torispherical end caps. Those skilled in the art will appreciate that the manifolds 130, 160 are interconnected with the tanks 178 at the hemispherical end portions because for a common tank thickness the stresses at the hemispherical end are typically one half the stresses imparted to the cylindrical tank portion interposed therebetween. Accordingly, any intrusion into the tank has significantly less structural impact upon the integrity of the tank at the hemispherical end sections than it would at the cylindrical body portion.

The tanks 178 are, received in nests 180, 182 formed by the metal hydride as shown. In a preferred embodiment, the metal hydride powder acts as shock absorbing material. Clearly this structure could be applied to the previously described dual-gas fuel tanks.

Those skilled in the art will readily appreciate that use of high pressure cylindrical composite tanks such as the tanks 122, 158, 178 discussed above, allows for the fuel tank housings 118, 154, and 172, 174 to be made of a substantially thinner gauge metal than in the other embodiments. The result is a reduction in weight, material costs, and enhanced product reliability and durability.

A dual gas fuel tank of the present invention tank is advantageous due to its ability to carry two different gases simultaneously and its ability to act as a vehicle load-carrying member thus allowing its placement on the vehicle which would not otherwise be used for passengers and/or cargo. The fuel carrying capacity of such a tank is sufficient to obtain a range comparable to or greater than conventional single, liquid or gas-fueled vehicles. The tank would be ideal for vehicles such as delivery vehicles which operate into and out of urban areas where frequent re-fueling periods would not be desirable or economical.

While specific embodiments of the invention have been shown and described in detail to illustrate the application and the principles of the invention, certain modifications and improvements will occur to those skilled in the art upon reading the foregoing description. It is thus understood that all such modifications and improvements have been deleted herein for the sake of conciseness and readability but are properly within the scope of the following claims.

We claim:

1. A dual-gas fuel tank assembly for powering a fuel cell driven vehicle, comprising:
    a fuel tank housing having a plurality of cylindrical pressure tanks therein for storing oxygen fuel for the fuel cell of the vehicle;
    metal hydride being placed within said fuel tank housing to fill the space around said pressure tanks and to act as a hydrogen source for the fuel cell of the vehicle; and
    means for mounting said tank housing to the vehicle allowing it to act as a structural member for the vehicle.

2. A dual-gas fuel tank assembly according to claim 1, wherein said mounting means comprises a pair of channel members extending from opposite ends of said fuel tank housing, said channel members engaging respectively associated ends of a vehicle side rail.

3. A dual-gas fuel tank assembly according to claim 1, wherein said cylindrical pressure tanks are constructed of a fiber reinforced composite material.

4. A dual gas fuel tank assembly according to claim 1, wherein said cylindrical pressure tanks comprise filament wound structures.

5. A dual-gas fuel tank assembly for a vehicle according to claim 1, wherein said metal hydride is a powdered Nickel Alloy.

6. A dual-gas fuel tank assembly according to claim 1, wherein said metal hydride is a powdered Lanthanum.

7. A dual-gas fuel tank assembly according to claim 1, further comprising a manifold interconnecting said plurality of cylindrical pressure tanks having inlet and outlet valves connected to said manifold.

8. A dual-gas fuel tank assembly according to claim 1, wherein said tank housing is of generally rectangular cross section and is constructed of stainless steel.

9. A dual-gas tank assembly according to claim 1, wherein said metal hydride is a powdered Nickel Alloy.

10. A dual-gas tank assembly according to claim 1 wherein said metal hydride is a powdered Lantham alloy.

11. A dual-gas fuel tank assembly for a fuel cell driven vehicle comprising:
    a tank housing positioned within side rails of a frame of a vehicle, said tank housing maintaining a plurality of oxygen gas pressure tanks therein and having space around said tanks for containing metal hydride;
    channel members extending from opposite ends of said tank housing and being securely engaged to respective ends of said side rails on opposite sides; and
    means for securing said tank housing to a floor of the vehicle.

12. A dual-gas tank assembly according to claim 11, wherein said pressure tanks are interconnected to a common manifold, said manifold having valve means for passing gas to and from said pressure tanks.

13. A dual-gas tank assembly according to claim 11, wherein said pressure tanks are cylindrical and fabricated from a fiber reinforced composite material.

14. A dual-gas tank assembly according to claim 11, wherein said pressure tanks are nestingly received within the metal hydride inside said tank housing.

15. A dual-gas tank assembly according to claim 12, wherein said securing means comprises an elongated member traversing said tank housing and being welded to both said tank housing and the floor.

16. A dual-gas tank assembly according to claim 15, wherein said securing means further comprises a pair of straps encircling said tank housing and being secured to the floor at opposite ends thereof.

17. A dual-gas tank assembly according to claim 16, wherein said tank is of substantially rectangular cross section.

18. A dual-gas tank assembly according to claim 17, wherein said straps and said elongated member are orthogonal to each other.

19. A dual-gas tank assembly according to claim 18, wherein said tank is of stainless steel construction.

* * * * *